May 5, 1970            G. H. REICH            3,510,252
VAPOR-TYPE HUMIDIFIER-DEODORIZER FOR WARM AIR HEATING SYSTEMS
Filed Feb. 28, 1967
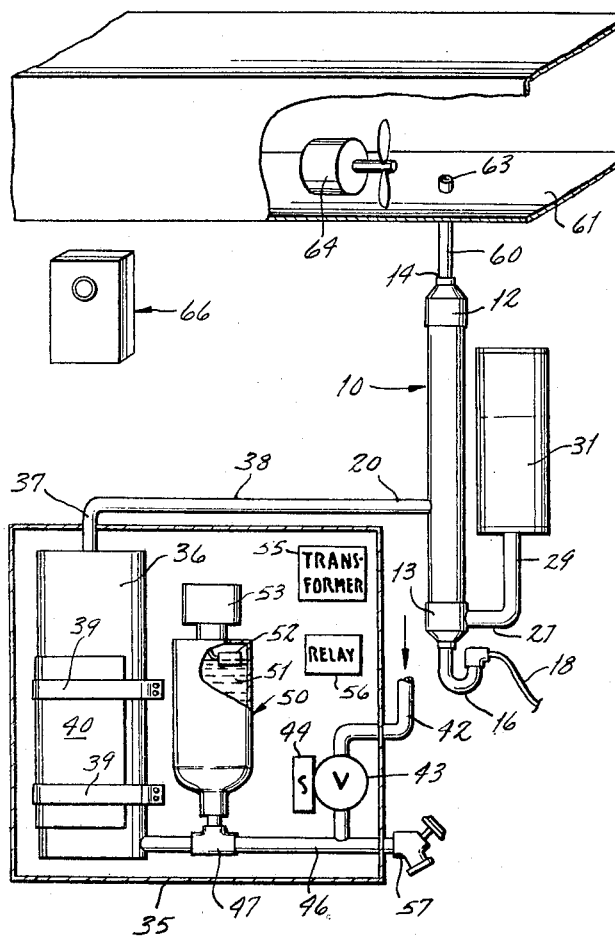
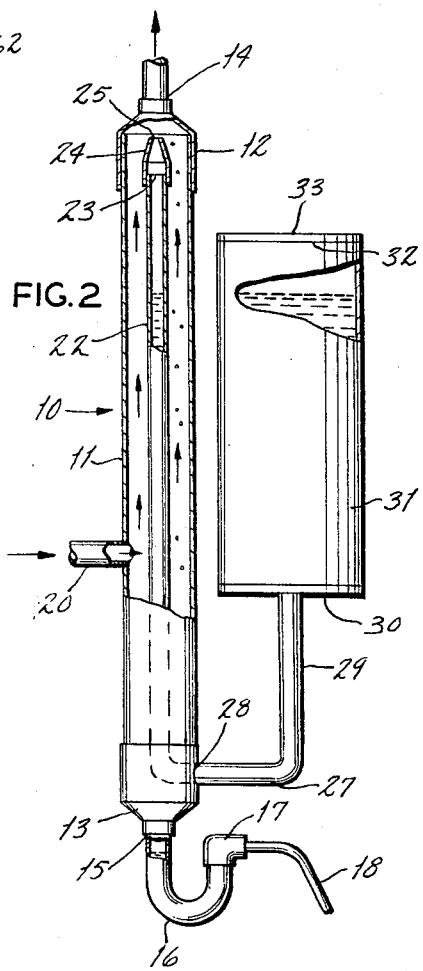
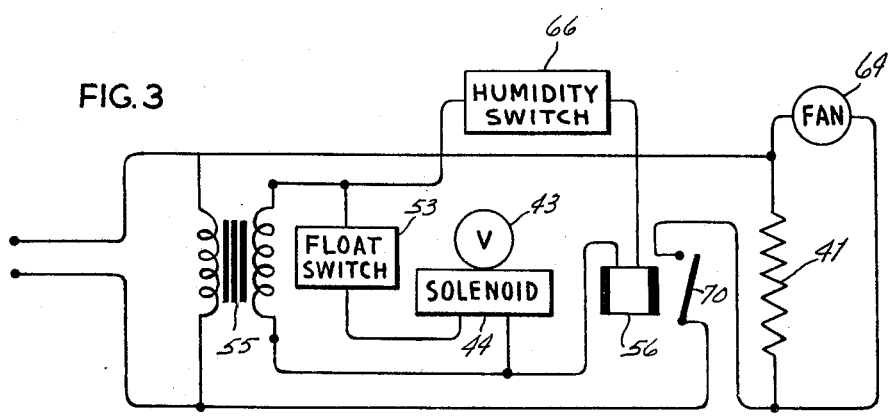
INVENTOR
GILBERT H. REICH
BY
Jerome A. Gross
ATTORNEY

United States Patent Office 3,510,252
Patented May 5, 1970

3,510,252
VAPOR-TYPE HUMIDIFIER-DEODORIZER FOR WARM AIR HEATING SYSTEMS
Gilbert H. Reich, 1082 E. Linden,
Richmond Heights, Mo. 63117
Filed Feb. 28, 1967, Ser. No. 619,342
Int. Cl. A61l 9/02
U.S. Cl. 21—74   4 Claims

ABSTRACT OF THE DISCLOSURE

"Dry" steam is supplied to a warm air heating duct by an electrically heated steam generator into the side of a vertical cylindrical precipitation chamber enclosing a heat-conductive standpipe from an external reservoir of deodorizing liquid. The slowed flow of the steam within the chamber permits precipitates, including not only moisture but also water-treating chemicals, to drop to a bottom outlet of the chamber, where a water trap prevents any outflow of steam. Relatively dry steam rises from the top outlet of the chamber into the heating duct, carrying intermixed deodorizing vapor from the open upper end of the heated standpipe.

BACKGROUND OF THE INVENTION

The present invention deals with humidifiers for warm air heating systems using ducts. In such systems it is conventional to add humidity, usually by some device which presents cool water in the central duct of the heating system, by means of evaporator plates, wet pads, wet pans, or nozzles; and steam has sometime been supplied. The prior art devices involve the problem of dripping water, rusting, musty odors, and disseminating precipitated lime and calcium into the room space heated as the water containing these water treating chemicals is taken up in the hot air blown through the central duct.

SUMMARY OF THE INVENTION

I provide a separator which supplies relatively dry water vapor to the warm air duct and which also removes some precipitated water treating chemicals. I also vaporize a deodorizing liquid and mix and discharge it with the water vapor into the heating duct.

My separator is a precipitation chamber having a top outlet, and also a bottom condensate outlet equipped with a water trap. At an intermediate level the chamber has a steam inlet. The cross-sectional area of the chamber is greater than that of its inlet, so that as steam flows into the chamber and rises, its speed of flow is slowed, and condensate and precipitates drop to the condensate outlet.

A heat conducting standpipe in the center of the chamber is supplied with deodorizing liquid from an external reservoir. Steam flowing into the chamber at the intermediate level vaporizes this liquid. The upper end of the standpipe has a reduced sized top opening beneath the top outlet of the chamber, through which the vaporized deodorizing liquid emerges, while the interior of the standpipe is at least partly shielded from dripping condensate.

The mixed steam and deodorizing vapor passes into the warm air heating duct through a common vapor inlet; and is intermixed into the air flow by an adjacent electric fan. Conventional humidity sensing controls energize the fan and a small steam generator which supplies the steam to the precipitation chamber.

BRIEF DESCRIPTION OF THE DRAWINGS

FIG. 1 is a view, partly in elevation and partly schematic, of a typical installation into a heating duct of the vapor and condensate separator of the present invention, combined with a vaporizer for deodorizing liquid, with an electric steam generator controlled by a humidity switch.

FIG. 2 is an enlarged view, partly in section, of the combined vapor and condensate separator and vaporizer for deodorizing liquid, shown at the right side of FIG. 1.

FIG. 3 is a somewhat simplified wiring diagram for the entire system of FIG. 1.

DESCRIPTION OF THE PREFERRED EMBODIMENT

The separator and deodorizer

Referring first to the enlarged view, FIG. 2, a vertical precipitation chamber generally designated 10 is formed of metal (preferably copper) tubing 11 having a relatively large inner diameter. To the upper and lower ends of the tubing 11 are brazed top and bottom reducers 12, 13, likewise preferably copper, the top reducer 12 having a top vapor outlet 14 and the bottom reducer 13 having a bottom condensate outlet 15. To the bottom outlet 15 is secured, as by brazing, the inlet end of a U-shaped water trap 16. At the outlet end of the water trap 16 is a connector fitting 17 which mounts a condensate outflow tube 18, which leads downward to a drain, not so shown.

In the sidewall of the chamber 10, well above the bottom condensate outlet 15, is a radially directed steam inlet 20. The cross-sectional area of the chamber 10 above the steam inlet 20 is much greater than the cross-sectional area of the steam inlet 20 itself.

Within the interior space of the chamber 10 and preferably concentric with it is a deodorizer standpipe 22 having an upper end opening below the level of the top outlet 14. The standpipe 22 is a tube of copper or other metal characterized by relatively high heat conductivity. In the embodiment shown the upper end opening consists of the upper end 23 of the standpipe together with a conical upward-and-inward tapering nozzle-like part 24 mounted thereon. A top opening 25 of the nozzle-like part 24 is presented concentrically with and beneath the top outlet 14 of the chamber 10. Alternatively, the upper end 23 of the standpipe 22 might itself be reduced to a size smaller than its internal diameter.

The standpipe 22 is supported at its lower end by a radially extending standpipe supply tube 27 which is brazed in a side opening 28 in the bottom reducer 13. On an upwardly extending exterior end 29 of the supply tube 27 is mounted the disc-like bottom 30 of a preferably transparent cylindrical reservoir 31 for a deodorizer liquid. The reservoir 31 is thus supported parallel and adjacent to the precipitation chamber 10. The top edge 32 of the reservoir 31 is somewhat below the upper end of the standpipe 22, and is covered by a disc-like cap 33, removable for filling.

The steam generator

FIG. 1 shows an electric steam generator connected to the steam inlet 20. In a rectangular cabinet 35, conveniently mounted at some level below that of the precipitation chamber 10, is an upright cylindrical water tank 36 having a top outlet tube 37 which leads through a steam conduit 38 of any required length to the steam inlet 20 of the precipitation chamber 10. Secured by a pair of straps 39 in heat-conductive contact with the exterior surface of the tank 36 is a heating blanket 40 including an electric resistance element 41 shown in the wiring diagram FIG. 3. The blanket 40 need not cover the entire cylindrical surface of the upright cylindrical water tank 36; but I find it advantageous to cover at least the larger part of that lower portion of the tank 36 which will be kept filled with water.

Water enters the tank 36 through a water supply line 42 having a normally closed supply valve 43 controlled by a solenoid 44. The valve 43 leads to a horizontal water pipe 46 which feeds into the bottom of the tank 36. A T 47 in the line 46 mounts a conventional water level control generally designated 50 which functions to keep the tank 36 filled to a desired level by opening and closing the valve 43. In the simplified illustration shown, the water level control 50 includes a liquid chamber 51 incorporating a float 52 whose raising and lowering operates a float switch 53. A transformer 55 and relay 56, mounted in the rectangular cabinet 35, are shown schematically. The electric connectors to all the electrical components mentioned are shown in the wiring diagram FIG. 3. A water drain valve 57 is mounted on an end of horizontal water pipe 46 which projects through the side of the rectangular cabinet 35.

Installation

A second conduit 60, for vapors rising from the precipitation chamber 10 and standpipe 22, leads upward, preferably vertically, into the bottom wall 61 of a rectangular warm air conduit generally designated 62; and terminates at a vapor inlet 63 in or slightly above the bottom wall 61, in the path of air flowing through the duct 62. An electric fan 64 located within the duct 62 is mounted on the bottom wall 61 adjacent in the path of air flow to the vapor inlet 63.

Within the room space heated by the duct 62 and whose humidity is to be controlled, a conventional humidity switch generally designated 66 is located. Such switch is an electric control which responds to relative humidity (that is, to demand for additional humidity) in the room space, in such manner as to energize the electrical heater 41 within the heat blanket 40 and also the fan 64 within the duct 62.

Wiring diagram

Alternating house current is supplied, according to the wiring diagram FIG. 3, to a transformer 55 and to a circuit a relay operated normally open main switch 70 and thence to parallel leads to both the resistance element 41 of the heat blanket 40 and the fan 64 in the duct 62. The transformer 55 supplies a lower voltage current to two parallel circuits. One of these includes in series the humidity switch 66 and the relay 56 which operates the main switch 70. A second parallel low voltage circuit includes in series the float switch 53 of the water level control 50 and the water supply valve-operating solenoid 44.

In actual installations elements of circuitry may be added as desired, such as a low-water cut-off and switches responsive to temperature. These are not the subject of the present invention.

Operation

When the wiring leads of FIG. 3 are connected to the house current, the low voltage current from the transformer 55 to the float switch 53 will close to operate the solenoid 44, causing the water supply valve 43 to open until the tank 36 is filled to the level at which the float switch will open. Assuming the humidity switch 66 senses low relative humidity in the heated space, it makes a low-voltage circuit to the relay 56 causing the main switch 70 to close, making a circuit to the heating blanket resistance 41 and a separate parallel circuit to the fan 64. When water in the tank 36 is heated by the resistance 41 to the boiling point, steam flows upward from the tank 36 through the conduit 38 into the precipitation chamber 10, through its side inlet 20. Because the cross-sectional area of the precipitation chamber 10 is so much greater than the cross-sectional area of the steam inlet 20, the speed of flow of the steam is slowed as it rises in the precipitation chamber 10. Condensed droplets of steam, carrying with them certain precipitates from entrained water treating chemicals, drop through the slowed flow to the bottom of the precipitation chamber 10 and to the water trap 16. When the system is first installed, the water trap 16 may be empty, in which case steam will temporarily be emitted therefrom; but as soon as the amount of condensate is sufficient to block the bottom of the trap 16, the trap functions to force all the steam to be emitted from the top outlet 14.

Falling droplets of condensate are shown in FIG. 2, while the arrows show the path of the steam vapor upward. The slowed vertical flow within the precipitation chamber 10 results in such precipitation which leaves only the relatively dry water vapor continuing upward through the vapor inlet 63 into the warm air duct 62. The fan 64 disseminates and distributes the relatively dry vapor in the warm air flowing through the duct 62, so effectively as to avoid the prior art problems of dripping water, and rusting. Precipitation of entrained water-treating chemicals seems to be sufficient to avoid the problems of distributing white chalky precipitates through the duct 62 into the heated room space, a result not entirely anticipated.

Utilizing a supply of dedorizing liquid in the reservoir 31 to fill it and the standpipe 22 to the level shown, and utilizing a radial steam inlet 20, as shown in FIG. 2, the steam entering the chamber 10 impinges on the lower part of the standpipe 22, at a level below that to which is normally filled with deodorant liquid from the reservoir 31. The impinging steam and the steam rising along the outer side of the standpipe 22 heat the deodorizing liquid within it, to gradually vaporize the liquid. While some steam may condense as it rises to the top of the chamber 10, the upward and inward tapering nozzle-like part 24 substantially shields the standpipe 22 from the dripping of such condensate. Also, the tapering cone shape of the part 24 tends to accelerate the speed at which the deodorant vapors rise, so that their flow into the surrounding steam vapor is augumented. The deodorizing vapor is thus emitted through the top opening 25 of the standpipe 22, to mix with the rising steam for discharge out of the top outlet 14 of the precipitation chamber 10 and into the heating duct 62. Thus, any stale, musty or otherwise undesirable odors are overcome.

Variations in detailed design and in electrical circuitry will occur to those familiar with the problems of such apparatus and installations. Accordingly this invention is not to be construed narrowly but rather as fully coextensive with the claims.

I claim:
1. The combination of a steam vapor-and-condensate separator and a vaporizer for deodorizer liquid, comprising a vapor-and-condensate separator including
    a precipitation chamber comprised of a vertical elongated tube having a top vapor outlet and a bottom condensate outlet,
    water trap means at the condensate outlet, and
    a steam inlet above the level of the bottom condensate outlet,
    the cross-sectional area of the chamber above the steam inlet being substantially greater than that of the steam inlet, together with
        a deodorizer liquid reservoir, and
        a heat-conductive standpipe within the interior space of the chamber and having a connection from its lower end to the lower end of the reservoir,
    the standpipe having an upper end opening below the level of the top outlet of the chamber,
    whereby rising steam within the chamber heats the deodorizing liquid within the standpipe, and its upper end opening emits and mixes deodorizing vapor into the rising steam for discharge therewith out of the top outlet.

2. The combination of a steam vapor-and-condensate separator and a vaporizer for deodorizer liquid as defined in claim 1, wherein the precipitation chamber is a hollow vertical cylinder, its steam inlet is radial, the said standpipe is concentric with the chamber and a lower portion of the standpipe is opposite the steam inlet, whereby steam entering the chamber impinges on said lower portion of the heat-conductive standpipe.

3. The combination of a steam vapor-and-condensate separator and a vaporizer for deodorizer liquid as defined in claim 1, wherein the upper end opening of the standpipe is smaller than its internal diameter, whereby the interior of the standpipe is substantially shielded from the dripping of condensate thereabove.

4. The combination of a steam vapor-and-condensate separator and a vaporizer for deodorizer liquid as defined in claim 1, wherein the standpipe has circumscribing its upper end opening, an upward-tapering nozzle-like part presented concentrically with and beneath the top outlet of the chamber, whereby vapor emitted from its upper end opening is accelerated and its flow into the surrounding rising steam vapor is augmented.

References Cited

UNITED STATES PATENTS

| | | | |
|---|---|---|---|
| 568,145 | 9/1896 | Sanderson | 137—171 |
| 2,262,772 | 11/1941 | Larsen | 21—74 XR |
| 2,810,167 | 10/1957 | Parks | 21—108 XR |
| 2,859,155 | 11/1958 | Cichelli et al. | 261—78.1 XR |
| 3,134,657 | 5/1964 | Anderson | 55—263 |

MORRIS O. WOLK, Primary Examiner

D. G. MILLMAN, Assistant Examiner

U.S. Cl. X.R.

21—118, 121; 55—225, 279; 137—171; 202—197; 261—35, 78, 118